United States Patent
Atkinson et al.

[15] 3,646,876
[45] Mar. 7, 1972

[54] FLOW THRU BODY VENTILATION

[72] Inventors: Ward J. Atkinson, Northville; Edward N. Cole, Bloomfield Hills, both of Mich.

[73] Assignee: General Motors Corporation, Detroit, Mich.

[22] Filed: Apr. 15, 1970

[21] Appl. No.: 28,641

[52] U.S. Cl. .................................................. 98/2.11
[51] Int. Cl. ............................................... B60h 1/24
[58] Field of Search ........................... 98/2, 2.04, 2.15

[56] References Cited

UNITED STATES PATENTS

| | | | |
|---|---|---|---|
| 3,286,617 | 11/1966 | Shirk | 98/2.04 |
| 3,329,078 | 7/1967 | De Castelet | 98/2.07 |
| 3,136,239 | 6/1964 | Geiger | 98/2.15 |
| 3,274,915 | 9/1966 | Ziegenfelder | 98/2.04 |
| 3,357,338 | 12/1967 | Pollock | 98/2.01 |

*Primary Examiner*—Meyer Perlin
*Attorney*—W. S. Pettigrew, J. C. Evans and K. H. MacLean, Jr.

[57] ABSTRACT

A ventilation system for the passenger compartment of an automobile including an air admission means for introducing air under pressure into the forward portion of the passenger compartment and an air passage through the automobile's exterior surface effective to conduct an uninhibited flow of air in either direction between the atmosphere and the passenger compartment and wherein the passage opens to the atmosphere in a substantially horizontal rear deck lid between a substantially neutral pressure area on the automobile's exterior surface as produced by airflow over the exterior surface during automobile movement.

3 Claims, 5 Drawing Figures

INVENTORS
Ward J. Atkinson &
BY Edward N. Cole

K. H. MacLeod, Jr.
ATTORNEY

INVENTORS
Ward J. Atkinson &
BY Edward N. Cole
K. H. MacLean, Jr.
ATTORNEY

FLOW THRU BODY VENTILATION

This invention relates to an automobile ventilation system having an uninhibited air passage between the atmosphere and the passenger compartment for conducting airflow in either direction therebetween.

An object of the present invention is to provide automobile ventilation which prevents buildup of excessive positive pressure in the passenger compartment when the vehicle windows are closed and to reduce the level of negative pressure in the compartment when the windows are opened at high-vehicle speeds.

A still further object of the invention is to provide automobile ventilation which reduces positive and negative pressures within the passenger compartment by airflow through a continuously open and uninhibited air passage between the passenger compartment and an opening in the automobile body which is located in a neutral pressure area thereon for airflow therethrough in either direction dependent upon the air pressure in the passenger compartment as produced by the combination of: air admission means including heater ducts, AC ducts and outside air vents; and the position of the vehicle windows being open, closed or partially cracked open.

Further objects and advantages of the present invention will be apparent from the following detailed description, reference being had to the accompanying drawings wherein a preferred embodiment of the present invention is clearly shown.

Figure 1:
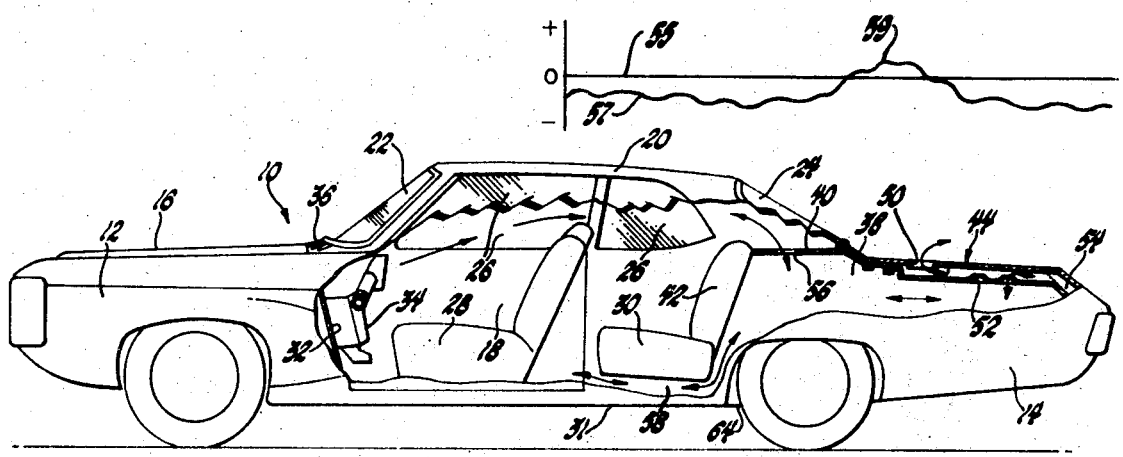
FIG. 1 is a vertical side view of an automobile broken away to reveal the passenger and trunk compartments.
Figure 2:
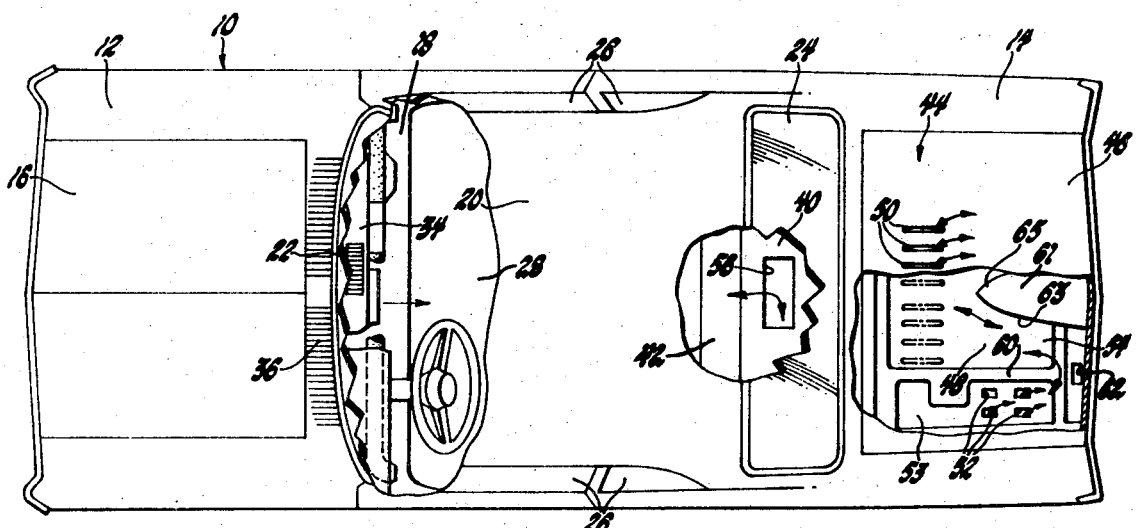
FIG. 2 is a horizontal top view of the automobile broken away to reveal details of the passenger compartment and the trunk compartment deck lid.

In FIGS. 1 and 2 of the drawings, an automobile body 10 is illustrated. It includes a forward body portion 12 and a rearward body portion 14. The forward portion 12 includes a hood 16 which covers the atomobile's internal combustion engine (not shown). Between forward portion 12 and the rearward portion 14 is a passenger compartment 18. The passenger compartment 18 is partially closed by a roof or top 20, a front windshield 22, a rear windshield or backlight 24, and a plurality of side windows 26. The side windows 26 can be opened at will by the automobile's occupants. A front seat 28 and a rear seat 30 are attached to the floor 31 of the passenger compartment 18 for passenger seating.

The passenger compartment 18 is separated from the engine by a firewall 32 which supports an air admission means 34 for introducing air under pressure into the passenger compartment 18. The air admission means 34 includes a fan (not shown) which draws air from the atmosphere through grill inlets 36 and pumps the air into the passenger compartment 18. A heater core and an evaporator core (neither visible) within the air admission means 34 conditions the air to achieve a predetermined temperature and humidity within the passenger compartment 18.

The rearward portion 14 of automobile 10 encloses a trunk compartment 38 which is separated from the passenger compartment 18 by a package shelf 40 and the seat back 42 of rear seat 30. The trunk compartment 38 is partially covered by a deck lid 44 which pivots along its front edge to provide access to the trunk compartment 38.

Figure 3:
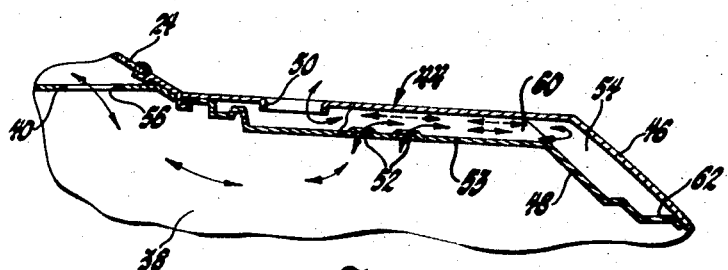
FIG. 3 is an enlarged vertical sectional view of the trunk compartment deck lid shown in FIG. 1.
Figure 4:
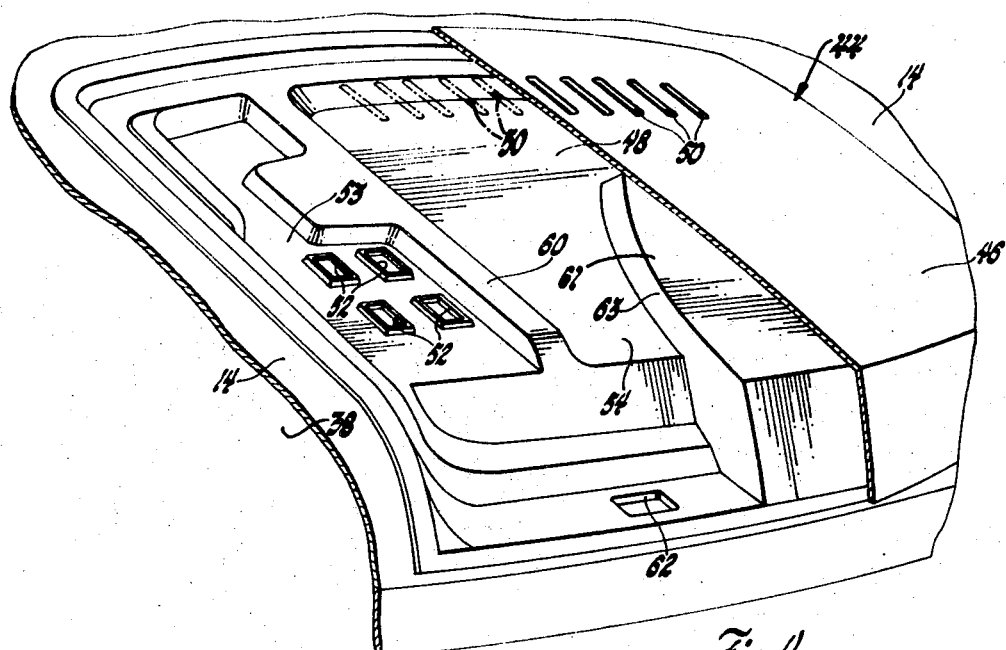
FIG. 4 is a perspective view of the trunk compartment deck lid broken away to reveal its spaced interior and exterior panels.

The deck lid 44, as best shown in FIGS. 3 and 4, includes a spaced outer panel 46 and inner panel 48 having exterior and interior surfaces respectively. Panels 46 and 48 are joined together along their peripheries by welding or other suitable means. An opening 50 extends through the exterior panel 46 in the form of multiple slots spaced laterally across the deck lid 44 as seen in FIG. 2.

A plurality of openings 52 extend through a recessed side surface portion 53 of the inner panel 48 into the trunk compartment 38. A deck lid flow path 54 defined by the spaced panels 46 and 48 communicates the opening 50 with openings 52. Together the opening 50, the deck lid flow path 54, and the openings 52 communicate the trunk compartment 38 with the atmosphere. An opening 56 in package shelf 40 and an opening 58 beneath rear seat 30 communicate the passenger compartment 18 and the trunk compartment 38. Thus, in the particular embodiment of the invention shown in the drawings an air passage extends between passenger compartment 18 and the atmosphere through openings 56 and 58, trunk compartment 38, openings 52, the deck lid flow path 54 and opening 50. This air passage conducts an uninhibited air flow in either direction between the passenger compartment 18 and the atmosphere. "Uninhibited" as used in this application refers to the absence of valving or similar unidirectional flow control means in the air passage. It is realized that a degree of resistance to airflow is inherent in any passage means and thus the use of the word "uninhibited" excludes this consideration.

As best seen in FIG. 4, an upwardly directed rib 60 in panel 48 engages the underside of panel 46 to laterally separate the openings 50 from the openings 52 to prevent water from passing through openings 52 into the trunk compartment 38. A divider member 61 is formed in panel 48 at the rear thereof and engages the panel 46 to define a curved surface 63 which causes the air flowing between openings 50 and 52 to follow a curved path around the rib 60 which separates air and water by centrifugal action thereon. An outlet 62 drains the collected water from between panels 46, 48 to a space between the rear framework of the trunk which directs the collected water outside.

The panel 48 includes a lateral separation rib, recessed side surface and air openings on its opposite side identical to rib 60, surface 53 and openings 52. These cooperate with a curved surface 65 on member 61 to separate air and water for drainage through a drain opening on the opposite side of the deck lid similar to opening 62.

The opening 50 extends laterally across the automobile 10 as shown in FIG. 2. In addition, opening 50 is located on the deck lid 44 in a substantially neutral pressure area as herein defined. The neutral pressure area is produced by air flow over the exterior surface of the automobile 10 caused by automobile movement. The schematic illustration immediately above the rear of the automobile in FIG. 1 shows the pressure profile with reference to atmospheric pressure of air flowing over the automobile's exterior surface. This profile is experimentally determined by wind tunnel tests on an automobile or a model of the automobile. Obviously, different automobile bodies have different pressure profiles.

The typical pressure profile illustrated in FIG. 1 corresponds to a Chevrolet two door hard top, shown in FIGS. 1 and 2. The solid horizontal reference line 55 which extends parallel to the ground represents a neutral or atmospheric pressure level. The portion 57 of the profile curve below this reference line represents a negative static pressure level with respect to atmospheric pressure. The portion 59 of the profile curve above this reference line represents a positive static pressure level with respect to atmospheric pressure. Note that the opening 50 is located at a zero or neutral pressure area which occurs between a positively pressurized surface area of the automobile and a negatively pressurized surface area of the automobile. It has portions of the slots extending slightly into the adjacent positive and negative regions of the profile. The averaged effect of the pressure profile at the slots is that of a neutral pressure point. In one working embodiment the slots have a total flow area of approximately 50 square inches which produce flow for ventilation in the passenger compartment in cooperation with the air admission means.

When the side windows 26 of the automobile 10 are closed, positive air pressure is built up within the passenger compartment 18 by the fan of the air admission means 34 which pumps air into the passenger compartment. Highly positive pressure levels in a passenger compartment are undesirable since they tend to produce wind noises as air flows from the automobile past window moldings. The positive pressure level within the passenger compartment 18 caused by this introduction of air by a fan is partially dependent on vehicle speed. An increase in vehicle speed will increase the volume of air introduced and consequently increase the pressure level in the passenger compartment 18. With a ram air admission means vehicle speed is even a greater determinative of the passenger compartment pressure level. The present ventilation system reduces high-positive pressure levels in the passenger compartment by an exhaust flow through the openings 56 and 58 through the trunk compartment 38, through openings 52, through the deck lid flow path 54 and through the opening 50 to atmosphere. Because the opening 50 is located in a neutral pressure area on the automobile body, the positive pressure within passenger compartment 18 causes air to flow from the passenger compartment 18 to atmosphere through opening 50.

It has been observed that when a side window 26 of the automobile 10 is opened approximately 6 inches resultant air flow out the opened window tends to produce a negative pressure level in the passenger compartment 18 with respect to the pressure level of air flowing beneath floor 31 of the automobile. The number of side windows lowered and the location of the windows with respect to other body portions affect the degree of negative pressure developed in the passenger compartment 18. Normally, a negative pressure level is experienced with the side windows lowered. The present ventilation system reduces high-negative pressure levels by a back flow of air from the atmosphere, through the opening 50, through the deck lid flow path 54, through openings 52, through trunk compartment 38, and through the openings 56, 58 into the passenger compartment 18. Because the opening 50 is located in a neutral pressure area on the automobile body, the negative pressure in the passenger compartment 18 causes air to flow from the atmosphere through the air passage into the passenger compartment 18. This maintains the passenger compartment 18 at a pressure level more positive than would otherwise be the case.

Figure 5:
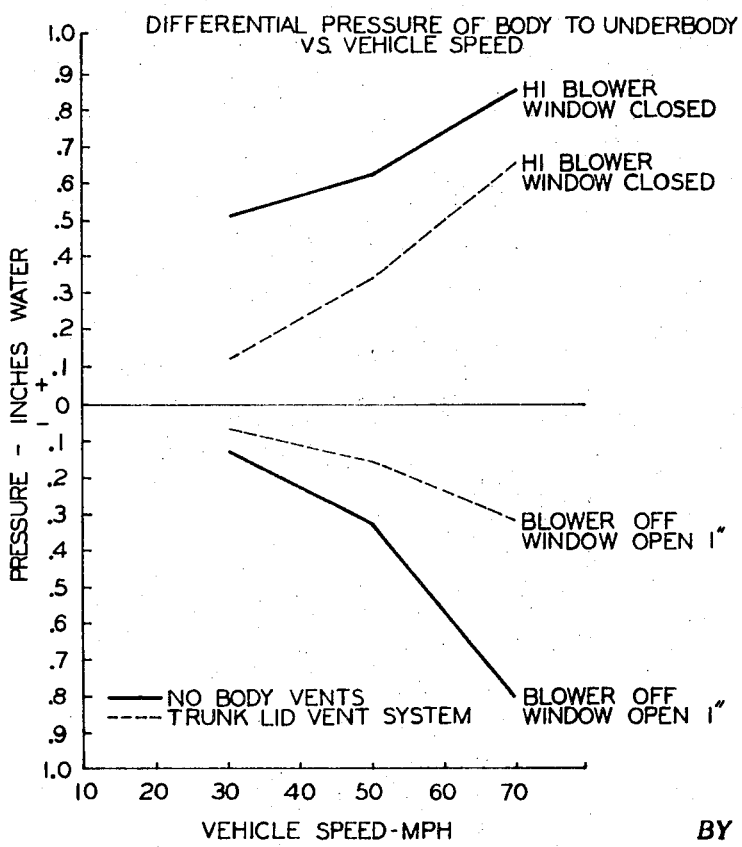
FIG. 5 is a plot of the passenger compartment pressure vs. the vehicle speed.

The effects of the present ventilation system have been determined by measurement of air pressure within the passenger compartment 18 during automobile movement. FIG. 5 is a plot of the passenger compartment pressure level with respect to the underbody pressure level vs. vehicle speed. The extreme in positive pressure within the passenger compartment occurs with high blower speed and all windows closed. The extreme in negative pressure occurs with the air admission means 34 off and the side window down. The solid lines represent pressure values taken during operation of the air admission means 34 while the opening 50 was taped closed. The air pressure in the passenger compartment was measured with respect to the automobile's underbody at location 64 in FIG. 1. When the tape was removed and the opening 50 exposed to conduct the aforedescribed uninhibited airflow into and from the passenger compartment 18, the relatively high negative pressure levels previously observed were significantly reduced. This pressure level reduction is shown by the dotted lines in FIG. 5. As per example, the negative pressure observed when the air admission system was off and the window open is reduced about 62 percent by air backflow into the passenger compartment 18.

The air admission means 34 in the Chevrolet tested and shown in FIGS. 1 and 2 included a heater and an evaporator core to condition the air introduced into the passenger compartment. A fan pumped air into the passenger compartment through the air admission means at an input of approximately 265 cubic feet per minute (c.f.m.) when in an air-conditioning mode of operation and approximately 220 c.f.m. when in a heating mode.

Part of the air in the passenger compartment is released to atmosphere through leakage past door and window moldings. Typical leakage rates for this particular production automobile are within the range of 150 to 250 c.f.m. at 0.5 $H_2O$ pressure. Naturally, this leakage affects the aforedescribed operation of the ventilation system. However, in this automobile exhaust airflow with windows closed and intake airflow with windows open were observed through the air passage of the ventilation system. This rate of airflow ventilates the passenger compartment.

While the embodiment of the present invention as herein described constitutes a preferred form, it is to be understood that other forms may be adopted.

What is claimed is as follows:

1. In an automobile of the type having an exterior conformation with a substantially horizontal rear deck lid that produces an area of substantially neutral air pressure between a zone of positive pressure and a zone of negative pressure when the automobile is in motion: a body defining a passenger compartment including a side window that may be opened and closed at will, and a floor exposed to airflow beneath the automobile, said window when open during automobile movement producing a more negative pressure within said compartment than is present underneath the automobile; air admission means for introducing air under pressure into the forward portion of said passenger compartment, the body having an airflow passage between the passenger compartment and the exterior of the automobile effective to conduct an uninhibited flow of air in either direction between the atmosphere and said passenger compartment, said passage being rearward of the air admission means and opening to the vehicle exterior in said substantially neutral pressure area as produced by airflow about said body during automobile movement; said airflow passage including a trunk compartment rearward of said passenger compartment and separated therefrom by a seat, said passenger compartment and said trunk compartment communicated by openings beneath said seat; said deck lid partially covering said trunk compartment and having spaced interior and exterior panels which define a deck lid flow path therebetween, openings in said interior panel communicating said trunk compartment with said deck lid flow path, openings in said exterior panel in said substantially neutral pressure area communicating said deck lid flow path with atmosphere whereby when said window is open and the automobile is moving air flows from the automobile's exterior through said exterior openings, said deck lid flow path, said interior openings and said trunk compartment into said passenger compartment and out said window, the airflow passage being so constructed and arranged that with the window open the passenger compartment is maintained by airflow thereinto at a substantially less negative pressure in relation to the pressure of air flowing underneath the automobile than otherwise would be the case.

2. In an automobile of the type having an exterior conformation with a substantially horizontal rear deck lid that produces an area of substantially neutral air pressure between a zone of positive pressure and a zone of negative pressure when the automobile is in motion: a body defining a passenger compartment including a side window that may be opened and closed at will, and a floor exposed to airflow beneath the automobile, said window when open during automobile movement producing a more negative pressure within said compartment than is present underneath the automobile; air admission means for introducing air under pressure into the forward portion of said passenger compartment; the body having an airflow passage between the passenger compartment and the exterior of the automobile effective to conduct an uninhibited flow of air in either direction between the atmosphere and said passenger compartment, said passage being rearward of the air admission means and opening to the vehicle exterior in said substantially neutral pressure area as produced by airflow about said body during automobile movement; said airflow passage including a trunk compartment rearward of said passenger compartment and separated therefrom by a seat, said passenger compartment and said trunk compartment communicated by openings beneath said seat; said deck lid partially covering said trunk compartment and having spaced interior and exterior panels which define a deck lid flow path therebetween, openings in said interior panel communicating said trunk compartment with said deck lid flow path, openings in said exterior panel in said substantially neutral pressure area communicating said deck lid flow path with atmosphere; a rib formed by an indentation in said interior panel extending toward said exterior panel and between said interior and exterior openings causing air flowing through said deck lid flow path between said openings to follow a curved path for separating water from airflow; whereby when said window is open and the automobile is moving air flows from the automobiles's exterior through said exterior openings, said deck lid flow path, said interior openings and said trunk compartment into said passenger compartment and out said window, the airflow passage being so constructed and arranged that with the window open the passenger compartment is maintained by airflow thereinto at a substantially less negative pressure in relation to the pressure of air flowing underneath the automobile than otherwise would be the case.

3. In an automobile of the type having an exterior conformation with a substantially horizontal deck lid that produces an area of substantially neutral air pressure between a zone of positive pressure and a zone of negative pressure when the automobile is in motion; a body defining a passenger compartment including a side window that may be opened and closed at will, and a floor exposed to airflow beneath the automobile, said window when open during automobile movement producing a more negative pressure within said passenger compartment than is present underneath the automobile; air admission means for introducing air under pressure into the forward portion of said passenger compartment; said body having an uninhibited airflow passage between the passenger compartment and atmosphere through the exterior of the automobile effective to conduct an uninhibited flow of air in either direction between the atmosphere and said passenger compartment, said passage being rearward of the air admission means and opening to the atmosphere through the automobile exterior in said substantially neutral pressure area as produced by airflow about said body during automobile movement, whereby when said window is open and the automobile is moving, air flows from atmosphere through both of said air admission means and said passage into the passenger compartment and out said window, the passage being so constructed and arranged that with the window open the passenger compartment is maintained by airflow thereinto from atmosphere at a substantially less negative pressure in relation to the pressure of air flowing underneath the automobile than otherwise would be the case.

* * * * *